United States Patent
Begin

(10) Patent No.: US 11,448,092 B2
(45) Date of Patent: Sep. 20, 2022

(54) TORSIONAL VIBRATION DAMPER

(71) Applicant: PRATT & WHITNEY CANADA CORP., Longueuil (CA)

(72) Inventor: Gilles Begin, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 261 days.

(21) Appl. No.: 16/837,146

(22) Filed: Apr. 1, 2020

(65) Prior Publication Data

US 2021/0222585 A1 Jul. 22, 2021

Related U.S. Application Data

(60) Provisional application No. 62/962,384, filed on Jan. 17, 2020.

(51) Int. Cl.
| | |
|---|---|
| *F04D 29/28* | (2006.01) |
| *F01D 25/06* | (2006.01) |
| *F16F 15/32* | (2006.01) |
| *F16F 15/34* | (2006.01) |
| *F04D 29/66* | (2006.01) |
| *F01M 5/00* | (2006.01) |

(52) U.S. Cl.
CPC .......... *F01D 25/06* (2013.01); *F04D 29/668* (2013.01); *F16F 15/32* (2013.01); *F16F 15/34* (2013.01); *F01M 5/002* (2013.01); *F01M 2005/004* (2013.01); *F05D 2240/20* (2013.01); *F05D 2260/96* (2013.01); *F16F 2224/02* (2013.01); *F16F 2224/025* (2013.01); *F16F 2224/0208* (2013.01); *F16F 2226/04* (2013.01); *F16F 2226/042* (2013.01); *F16F 2230/0005* (2013.01); *F16F 2232/02* (2013.01)

(58) Field of Classification Search
CPC ........ F01D 25/04; F01D 25/06; F04D 29/668; F05D 2260/96; F16F 2226/04
See application file for complete search history.

(56) References Cited

U.S. PATENT DOCUMENTS

| | | | |
|---|---|---|---|
| 3,610,772 A | 10/1971 | Wagle | |
| 3,901,101 A * | 8/1975 | McGavern | F16F 15/1442 74/574.4 |
| 4,825,718 A * | 5/1989 | Seifert | F16F 15/10 74/573.1 |
| 4,957,414 A * | 9/1990 | Willingham | F04D 29/668 416/241 A |
| 5,632,600 A | 5/1997 | Hull | |
| 6,213,720 B1 | 4/2001 | Farmer | |
| 7,047,914 B2 * | 5/2006 | Komorowski | F02B 63/06 123/41.47 |
| 8,226,367 B2 | 7/2012 | Baumhauer et al. | |
| 2012/0027571 A1 * | 2/2012 | Cho | F04D 29/329 267/141 |
| 2013/0156584 A1 | 6/2013 | Anderson et al. | |

* cited by examiner

*Primary Examiner* — Ninh H. Nguyen
(74) *Attorney, Agent, or Firm* — Norton Rose Fulbright Canada LLP.

(57) ABSTRACT

A rotor assembly has a drive shaft and a bladed rotor mounted to the drive shaft for rotation therewith. A dampening material is bonded to the rotor at a location where there is torsional strain energy present. Shear forces in the damping material are used to convert the torsional strain energy into heat energy, thereby providing torsional vibration damping.

18 Claims, 5 Drawing Sheets

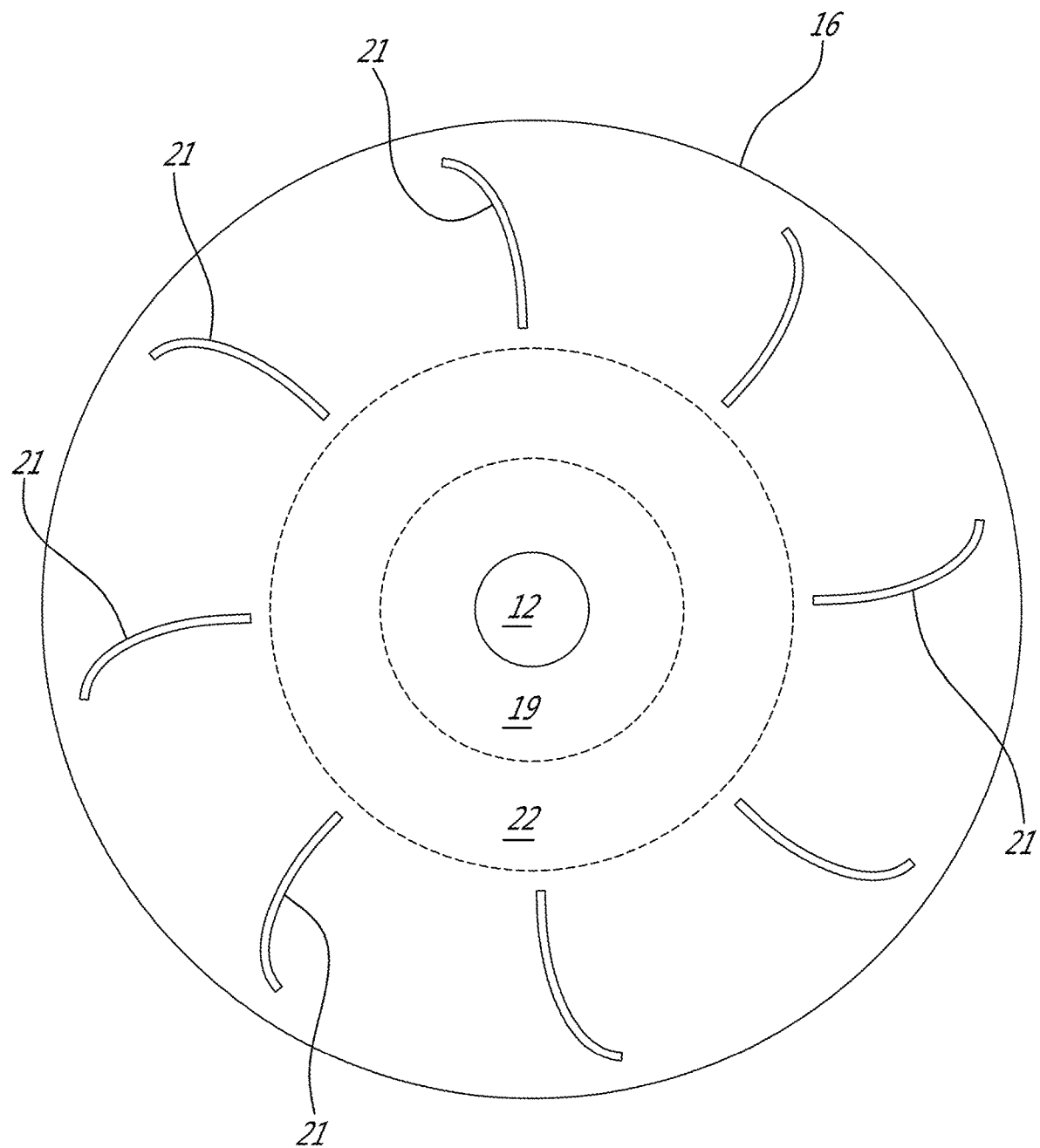

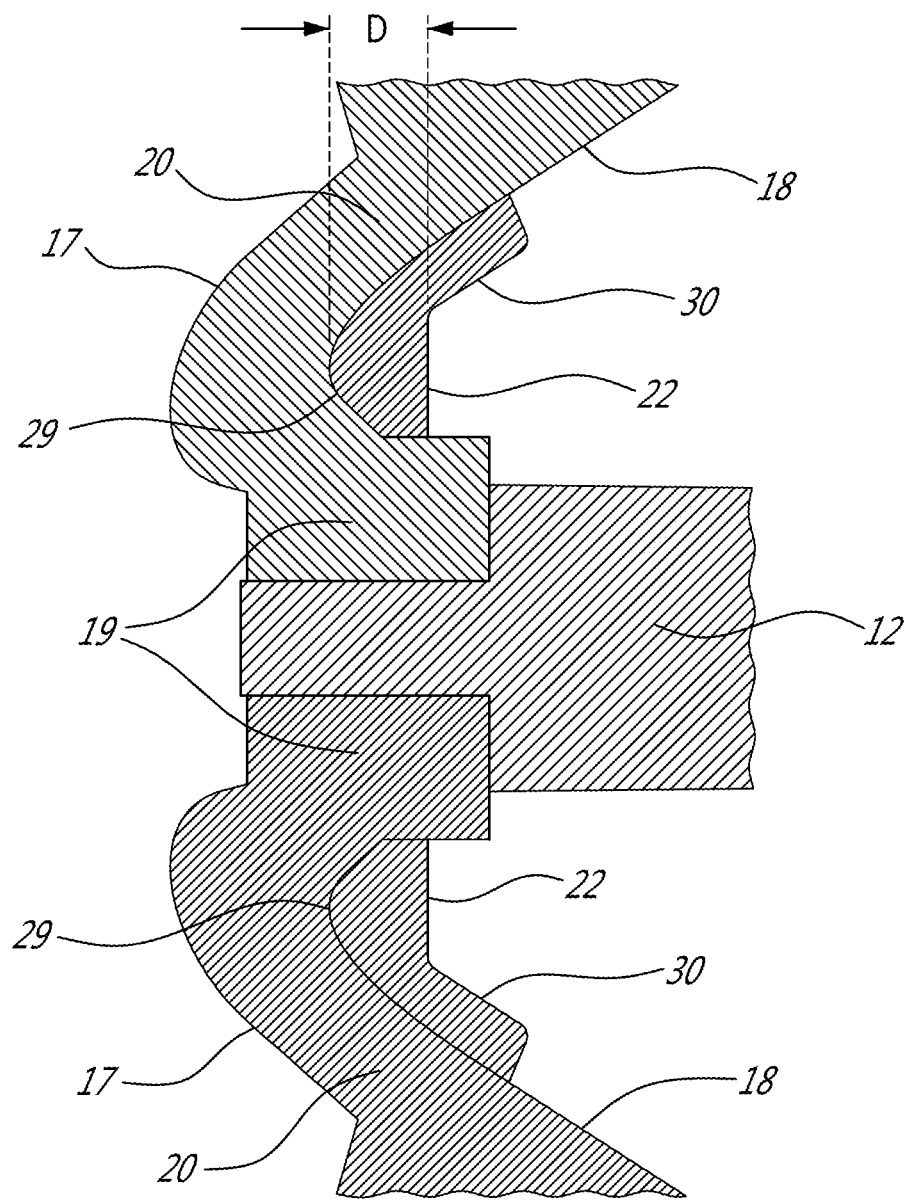

TORSIONAL VIBRATION DAMPER

CROSS-REFERENCE TO RELATED APPLICATIONS

This application claims priority to U.S. provisional patent application No. 62/962,384 filed Jan. 17, 2020, the entire contents of which are incorporated by reference herein.

TECHNICAL FIELD

The disclosure generally relates to torsional vibration dampening of a high speed lightweight rotor such as a cooling fan of an air cooled oil cooler of a gas turbine engine.

BACKGROUND

Lightweight rotors, such as the rotor of a cooling fan, can be operated at high rotational speeds to intake air into the central hub area. The rotors can be made of lightweight metal such as aluminum or metal alloy. Vibration can be caused by aerodynamic and mechanical forces exerted on the rotor during high speed rotation. Torsional vibration represents the angular strain or deformation of a rotor caused by stress induced about the axis of rotation (i.e. twisting vibration about the axis of rotation). Torsional vibration can cause premature wear of the rotor, overstressing of material, fatigue crack propagation, and eventually rotor failure.

The vibration of rotors is affected by mass and balance. Simply increasing the metal wall thickness in an attempt to reduce or distribute torsional stress may increase mass significantly and resulting in increased centrifugal stresses at high rotational speeds. Improvement is thus desirable.

SUMMARY

The disclosure a cooling fan comprising: a drive shaft with an axis of rotation; a rotor having a hub mounted on the drive shaft, a web extending from the hub away from the axis of rotation, a circumferentially spaced array of blades on an air flow surface of the web, and a rear surface of the rotor; a housing surrounding the rotor and a portion of the drive shaft, the housing having an air inlet and an air outlet, the housing defining an air flow passage with the air flow surface of the web and a shielded plenum with the rear surface of the rotor; and a vibration dampening material bonded to the rear surface of the rotor in the shielded plenum, the vibration dampening material bonded in a maximal strain zone of the rotor.

In a further aspect the disclosure describes a method of reducing torsional vibration of a cooling fan, the fan including a rotor having a hub mounted on a drive shaft, a web radially extending from the hub, a circumferentially spaced array of blades on an air flow surface of the web, and a rear surface of the rotor, the method comprising: bonding a vibration dampening ring to the rear surface of the rotor.

According to a still further general aspect, there is provided a means to dampen the torsional dynamic response of a cooling fan rotor by adding a dampening material in a rearward recess or cavity of the fan rotor. The dampening material is located where maximum torsional strain occurs and where the fan rotor material deforms. The dampening material does not change the fan's aerodynamic performance since the vibration dampening ring is bonded to the rearward surface of the fan rotor. The rearward surface is shielded from air flow and there is substantially no airflow in the fan housing where the dampening material is located. The dampening material directly adds dampening to reduce the fan torsional response without substantially affecting the aerodynamic geometry of the fan. The added dampening material can be selected to optimize the weight/dampening impact. Since the added vibration dampening material does not engage the primary air flow over the fan, the dampening material geometry and composition can be adjusted to provide the required dampening without significantly increasing the fan rotor weight or aerodynamic properties.

Further details of these and other aspects of the subject matter of this application will be apparent from the detailed description included below and the drawings.

DESCRIPTION OF THE DRAWINGS

FIG. 4 is a downstream view of the fan rotor along line 4-4 of FIG. 3 with the vibration dampening ring shown in hidden dashed outline.

FIG. 5 shows a detail view of the fan rotor hub, web and vibration dampening ring.

DETAILED DESCRIPTION

Figure 1:
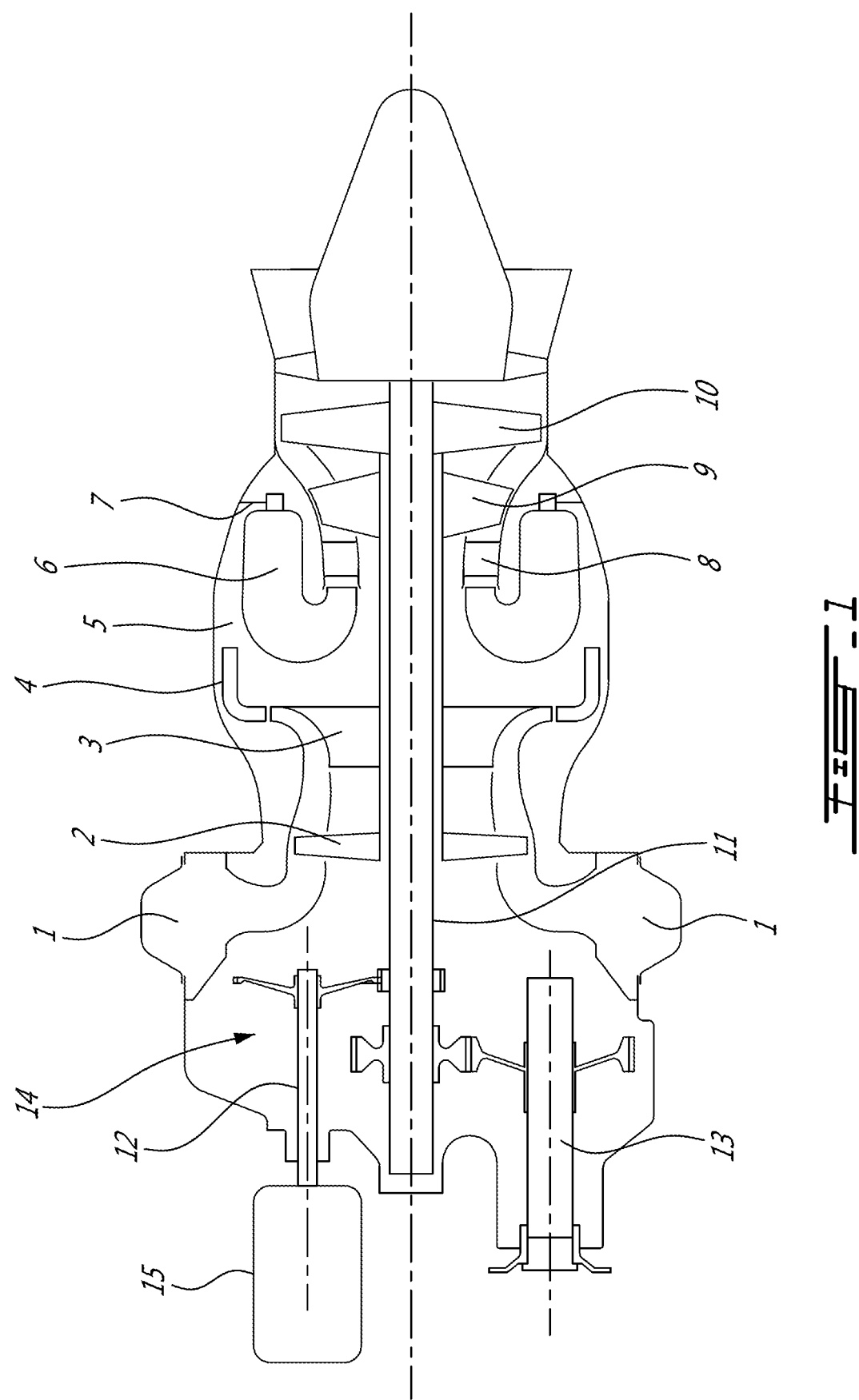
FIG. 1 shows an axial cross-section view of an example turboshaft gas turbine engine, having an auxiliary shaft driving a fan rotor of an air cooled oil cooler.

FIG. 1 shows an axial cross-section through an example aircraft engine. In the illustrated embodiment, the aircraft engine is a turboshaft gas turbine engine. However, it is understood that the aircraft engine could adopt various other forms, such as a turbofan, a turboprop or a compounded engine. The air intake 1 draws air into the engine. Air passes through the low-pressure axial compressor 2 and high-pressure centrifugal compressor 3. Compressed air exits the compressor section through a diffuser 4 and is contained within a plenum 5 that surrounds the combustor 6. Fuel is supplied to the combustor 6 through fuel tubes 7 and fuel is mixed with air from the plenum 5 when sprayed through nozzles into the combustor 6 as a fuel air mixture that is ignited. A portion of the compressed air within the plenum 5 is admitted into the combustor 6 through orifices in the side walls to create a cooling air curtain along the combustor walls. Spent cooling air and the hot gases from the combustor 6 mix together and pass over the nozzle guide vane 8, low pressure turbine blades 9 and high pressure turbine blades 10 before exiting the engine.

The high pressure turbine blades 10 rotate the high pressure shaft 11. An auxiliary shaft 12 and a main drive shaft 13 are driven by shaft 11 via the reduction gear box 14. The auxiliary shaft 12 can connect to engine components such as an electric starter motor, oil pump, or fuel pump. In the example of FIG. 1, the auxiliary shaft 12 drives an air cooled oil cooler 15. The air cooled oil cooler 15 has an internal fan (not shown in FIG. 1) that draws in ambient air to cool an air-oil heat exchanger of the engine oil circulating system.

Figure 2:
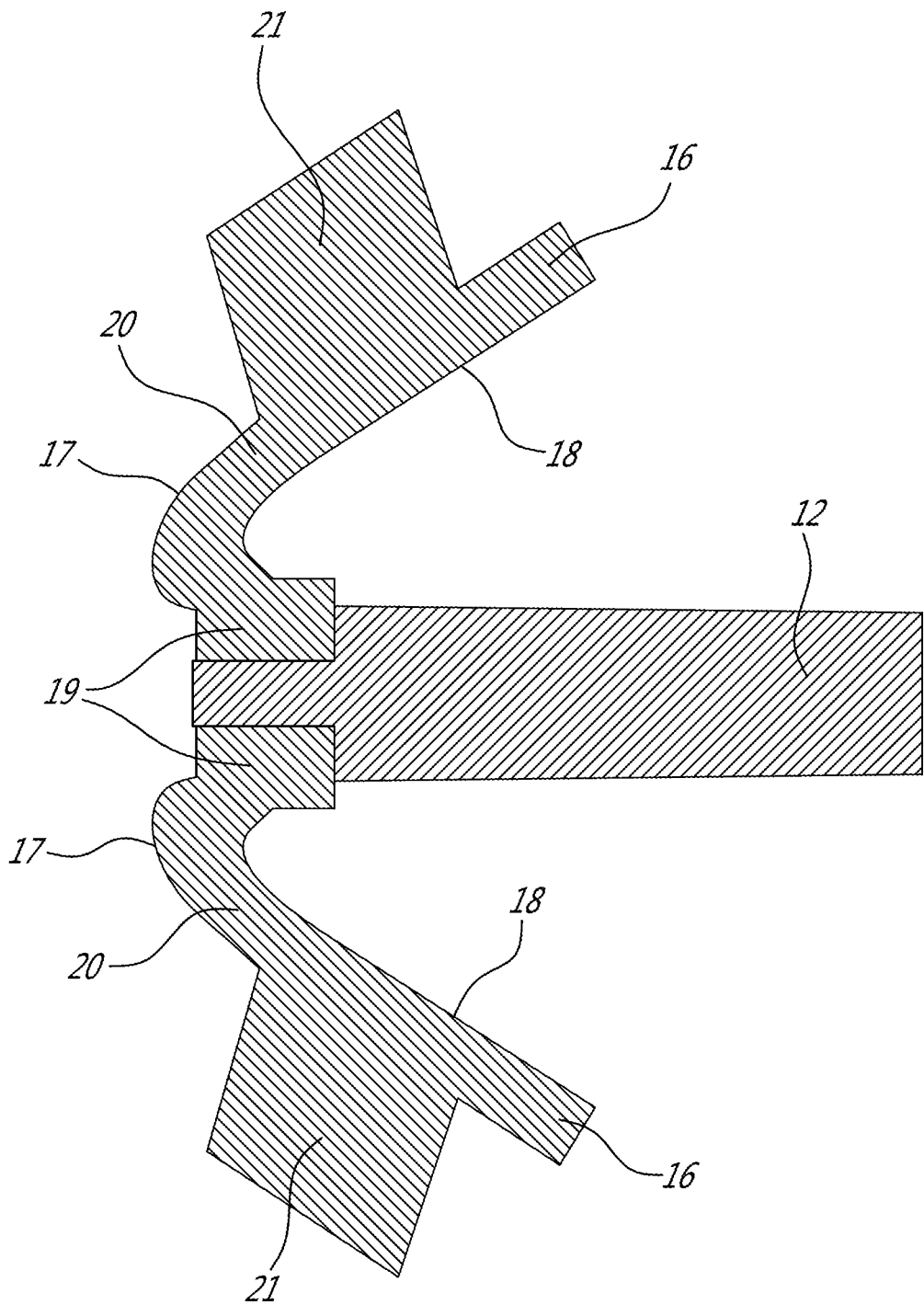
FIG. 2 is a schematic axial cross-section of an example fan rotor mounted on a central shaft.

FIG. 2 shows a schematic axial cross-section of an example fan rotor 16 suitable for drawing cooling air through the air cooled oil cooler 15. As shown in FIG. 2, the fan rotor 16 is mounted on the auxiliary shaft 12. The fan rotor 16 of the air cooled oil cooler 15 can be relatively small in diameter such as 5 inches (127 mm) and can be very lightweight such as 0.75 lb (0.34 kg) weight. Such fan rotors 16 can be cast from aluminum alloy and have an aerodynamically shaped forward surface 17 leading to fan blades 21. The rearward surface 18 is shielded within a fan housing 25 (see FIG. 3) and does not engage primary air flow over the fan rotor 16. The fan rotor 16 has a central hub 19 mounted to the auxiliary shaft 12 with splines, a keyway or the like. A web 20 of the fan rotor 16 extends radially outwardly from the central hub 19 and supports the multiple fan blades 21 in a circumferentially spaced apart array. The term "web" is herein intended to broadly refer to the surface joining the hub 19 to the fan blades 21. According to the illustrated embodiment, the web 20 is a continuous aerodynamic surface extending from a nose to an annular trailing edge. It can adopt various aerodynamic profiles. For instance, it can have an ovoid-like or conical shape with a rounded nose. According to various embodiments, the web 20 is integral to the hub 19. Accordingly, the web 20 can be viewed as part or as an extension of the central shaft mounting portion of the hub 19.

The rotor 16 may be operated at rotary speeds of 20,000 rpm. Finite element analysis and physical empirical tests indicate that the rotor 16 is particularly vulnerable to torsional vibrations in area of the web 20 and in the transition zone between the web 20 and hub 19. Alternating shear forces within the web 20 can be generated by torsional vibration induced in the rotor 16 during operation as a result of air flow turbulence, fan material imbalance, or fan loading imbalance.

Figure 3:
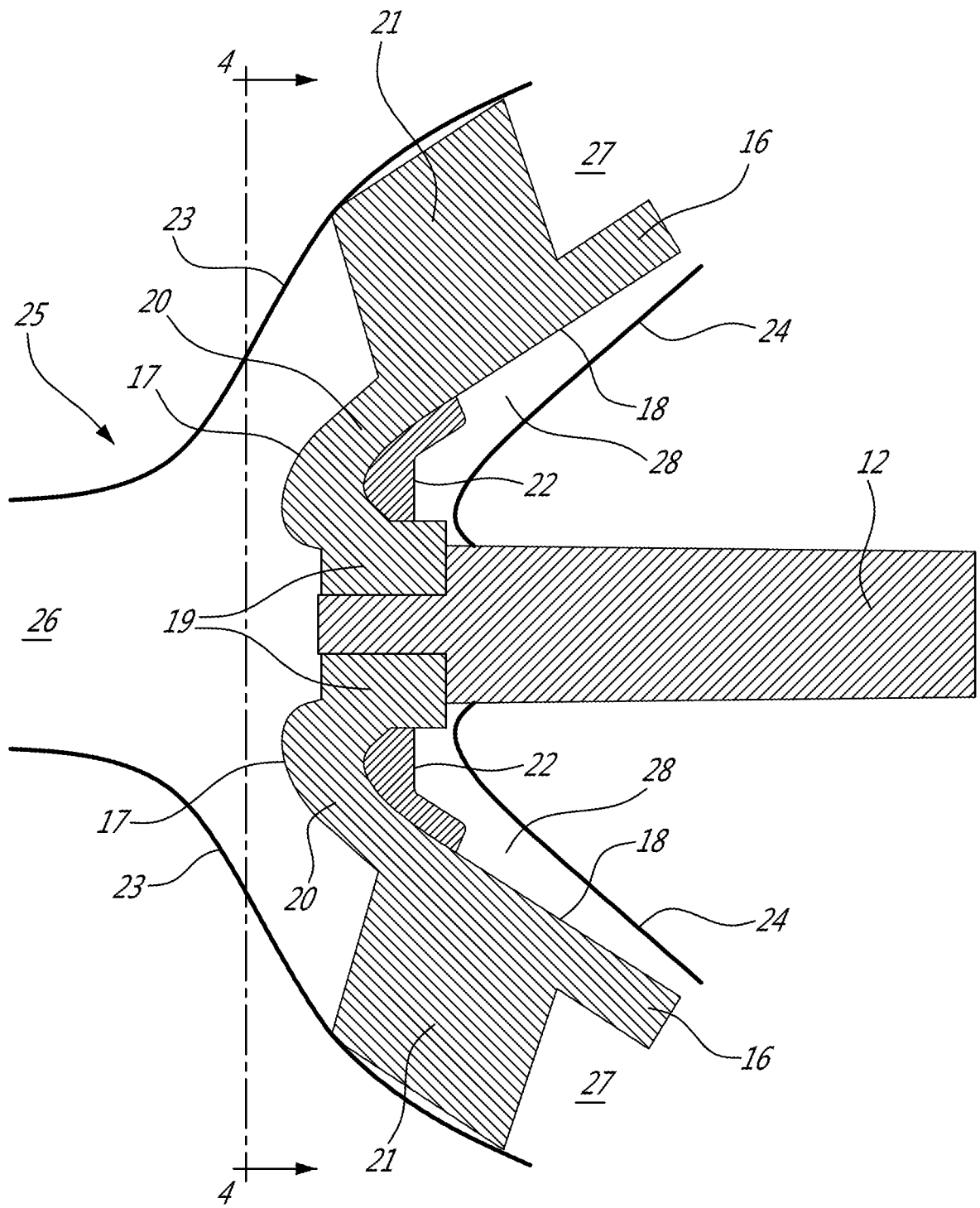
FIG. 3 is a schematic axial cross-section of a fan rotor with a vibration dampening ring mounted on a rearward surface of the fan rotor.

FIG. 3 shows a schematic cross-sectional view of the cooling fan rotor 16 of FIG. 2 with the addition of a vibration dampening material. In the illustrated example, the vibration dampening material is embodied in the form of a vibration dampening ring 22. FIG. 4 shows a radial view of the fan rotor 16 with the vibration dampening ring 22 shown in hidden dashed outline. FIG. 3 also shows the forward wall 23 and rearward wall 24 of the fan housing 25 that surrounds the fan rotor 16 and auxiliary shaft 12.

The vibration dampening ring 22 provides additional torsional shear resisting material which is applied to the fan web 20 where torsional strain energy is highest. The torsional dynamic response of the fan rotor 16 reveals areas of maximum torsional strain. The bonding and shear load transfer connection between the web 20 and ring 22 distributes torsional stress to the ring 22 which deforms and dissipates torsional vibration energy as heat energy. The locating of the vibration dampening ring 22 on the rearward surface of the web 20 does not alter the air flow or aerodynamics of the exposed forward surface 17. The geometry of the forward surface 17 is not altered and the vibration dampening ring 22 does not add significant weight. The vibration dampening ring 22 can be bonded during manufacture or can be retrofit to an existing rotor 16. The vibration dampening ring 22 can, for instance, be made of low stiffness malleable metal alloy, rubber, silicon or polyurethane. The vibration dampening ring 22 can be applied as a coating, as a metal droplet spray or can be part of an additive manufacturing process.

Referring to FIGS. 3-5, the present description provides a method of reducing torsional vibration in the fan rotor 16 by bonding the vibration dampening ring 22 to the rear surface 18 of the web 20 of the fan rotor 16.

According to embodiment, the fan includes the auxiliary shaft 12 with a central axis of rotation coaxial to the auxiliary shaft 12. The fan rotor 16 has a central hub 19 mounted on the auxiliary shaft 12, a web 20 radially extending from the hub 19, a circumferentially spaced array of fan blades 21 on a forward surface 17 of the web that is exposed to air flow, and a rear surface 18 of the web 20. The fan housing 25 (FIG. 3) surrounds the fan rotor 16 and an end portion of the auxiliary shaft 12. The fan housing 25 has an air inlet 26 and an annular air outlet 27. The forward wall 23 of the fan housing 25 defines an air flow passage with the forward surface 17 of the web 20. A shielded plenum 28 is defined between the rearward surface 18 of the web 20 and the rearward wall 24 of the fan housing 25. The plenum 28 is generally shielded from the flow of air drawn by the blades 21 and as such the alteration of the surfaces bounding the plenum has less to no aerodynamic impact on the flow of air induced by the fan.

The vibration dampening ring 22 is bonded to the rearward surface 18 of the web 20 of the fan rotor 16. The vibration dampening ring 22 can be manufactured separately or can be applied as a coating from various materials such as: rubber; silicon; polyethylene; metal alloy; carbon fiber and resin composite; and combinations thereof. Further the vibration dampening ring 22 can be built up from multiple bonded layers in various combinations of such materials.

In order to transfer torsional shear loads between the web 20 and the vibration dampening ring 22, the rearward surface 18 of the web 20 and forward surface of the vibration dampening ring 22 can be bonded with adhesive. The vibration dampening ring 22 can also be deposited as particles or droplets deposited on the rearward surface 18 of the web 20 as a coating, a metal spray deposition layer, or during an additive manufacturing process. For mechanical bonding to the vibration dampening ring 22, the rearward surface 18 of the web 20 can also include protrusions, ribs, fins, knurling or grooves.

Referring to FIG. 5, in the example illustrated the rearward surface 18 of the web 20 includes an annular concave recess 29 that defines the forward boundary of the vibration dampening ring 22. The rear surface 30 of the vibration dampening ring 22 is shown with an inner radial annular surface and an outer conical surface. The annular concave recess 29 has a maximum axial depth D at a junction between the hub 19 and the web 20 in the example illustrated.

According to one aspect, the torsional dynamic response of a rotor is damped by adding a dampening material directly to the rotor. The dampening material is applied where the rotor torsional strain energy is present. The torsional stress loaded regions on the rotor are determined by stress-strain analysis. Stress analysis may be performed through classical mathematical techniques, analytic mathematical modelling or computational simulation (e.g. finite element modeling), experimental testing, or a combination of methods. By establishing the torsional mode shape of the rotor and understanding its dynamic response to torsional vibration, the regions subject to modal deformation in torsion can be established.

Once the location of the stress regions (where the rotor material deforms) has been established, the dampening material is applied over those regions to dissipate the torsional vibration energy. According to the illustrated embodiment, the dampening material 22 is applied in a rear cavity of the rotor. As such, the dampening material 22 does not alter the aerodynamic properties of the exemplified cooling fan. Indeed, by positioning the dampening material 22 on the rear face of the rotor in the rear rotor cavity, the dampening material 22 is virtually shielded from the flow of air drawn by the blades 21.

The dampening material 22 may be provided in the form of a dampening ring continuously extending over 360 degrees about the hub 20 of the rotor 16. However, it is understood that the dampening material 22 could be provided in the form of ring segments. In fact, the dampening material 22 could adopt various forms and geometries to match the geometry and the dynamic response of the rotor on which it is applied. According to one aspect, the dampening material 22 is configured as a function of the stress loading geometry of the rotor which needs to be damped. In the illustrated example, the dampening material 22 extends partially over both the hub 19 and the web 20 on the rear side of the rotor 16. The thickness of the dampening material 22 varies according to the stress analysis and desired dampening ratio.

The dampening material 22 is a material suitable to dissipate the torsional strain energy via shear forces. The shear forces induced in the dampening material damp the torsional vibrations by transforming them into heat energy. The dampening material 22 is more flexible than the base material of the rotor 16 so as to be subject to shear forces in response to torsional dynamic response of the rotor base material, thereby dissipating the torsional vibration energy. For instance, the dampening material 22 could be a rubber-like material or a silicon material bonded to the rear face of the rotor 16 over the regions vulnerable to torsional vibration excitation (region prone to deformation in torsion).

According to one aspect of the present disclosure, there is provided a means to damp the torsional dynamic response of a cooling fan by adding a dampening material in a cavity of the fan hub. This location was selected based on the fan's torsional mode shape. The dampening material is located where there is torsional strain energy present (i.e. where the base material deforms). The dampening material does not change the fan's aerodynamic performance since there is substantially no airflow in the cavity of the fan hub where the dampening material is located. The dampening material directly adds dampening to reduce the fan torsional response without affecting the aerodynamic geometry of the fan. The added dampening material can be adjusted to optimize the weight/dampening impact. This is done through an analysis with usual assumptions, such as the dampening ratio. Then, the design can be validated through physical tests. As the added dampening material is not part of the aerodynamic of the fan, its geometry can be adjusted to provide the required dampening without significantly increasing the component's weight.

The shape, volume and material properties of the vibration dampening ring 22 can be modified in numerous ways to suit the torsional stress requirements, radial stress and geometry of the adjoining components. For example, use of carbon fibre compounds or carbon fibre fabrics may dictate different shape and volume requirements compared to use of metal alloys or additive manufacturing. The vibration dampening ring 22 can be manufactured either separately or in conjunction with manufacture of the fan rotor 16. Bonding using adhesives or mechanical protrusions or grooves in the rearward surface 18 of the web 20 may dictate changes to the shape and volume of the vibration dampening ring 22.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, it is understood that the present disclosure is not limited to cooling fans. Other lightweight, high speed, lightly damped high frequency vibration rotors could be damped by the addition of a layer of dampening material over the rotor regions where torsional strain energy is susceptible to induce crack propagation. Yet further modifications could be implemented by a person of ordinary skill in the art in view of the present disclosure, which modifications would be within the scope of the present technology.

What is claimed is:

1. A cooling fan comprising:
a drive shaft with an axis of rotation;
a rotor having a hub mounted on the drive shaft, a web extending from the hub away from the axis of rotation, a circumferentially spaced array of blades on an air flow surface of the web, and a rear surface of the rotor, the rear surface having an annular concave recess around the drive shaft;
a housing surrounding the rotor and a portion of the drive shaft, the housing having an air inlet and an air outlet, the housing defining an air flow passage with the air flow surface of the web and a shielded plenum with the rear surface of the rotor; and
a vibration dampening material bonded to the rear surface of the rotor in the annular concave recess, the vibration dampening material bonded in a maximal strain zone of the rotor.

2. The cooling fan according to claim 1 wherein the vibration dampening material comprises material selected from the group consisting of: rubber; silicon; polyethylene; metal alloy; carbon fiber and resin composite; and combinations thereof.

3. The cooling fan according to claim 2 wherein the vibration dampening material comprises a plurality of bonded layers of said combinations.

4. The cooling fan according to claim 1 wherein the rear surface of the rotor and the vibration dampening material are bonded with adhesive.

5. The cooling fan according to claim 1 wherein the vibration dampening material comprises one of: particles; and droplets deposited on the rear surface of the rotor.

6. The cooling fan according to claim 5 wherein the vibration dampening material comprises one of: a coating; a metal spray deposition layer; and an additive manufacturing layer.

7. The cooling fan according to claim 1, wherein the annular concave recess has a maximum axial depth region at a junction between the hub and the web, the vibration dampening material being provided in the maximum axial depth region.

8. The cooling fan according to claim 1, wherein the rear surface of the web includes one of: protrusions; ribs; fins; knurling; and grooves for bonding to the vibration dampening material.

9. A method of reducing torsional vibration of a cooling fan,
the cooling fan including a rotor having a hub mounted on a drive shaft, a web extending away from the hub, a circumferentially spaced array of fan blades on an air flow surface of the web, and a rear surface of the rotor, the method comprising:
bonding a vibration dampening material to the rear surface of the rotor, wherein the vibration dampening material is bonded to the rear surface of the rotor at a maximal strain zone, and wherein the method further comprises determining the maximal strain zone using one of: finite element analysis; and empirical testing.

10. The method according to claim 9 wherein the vibration dampening material is manufactured separately from the rotor and is bonded to the rotor with adhesive.

11. The method according to claim 9 wherein the vibration dampening material is applied to the rotor as one of: a coating; a metal spray deposition layer; and an additive manufacturing layer.

12. The method according to claim 9 wherein the vibration dampening material comprises material selected from the group consisting of: rubber; silicon; polyethylene; metal alloy; carbon fiber and resin composite; and combinations thereof.

13. The method according to claim 12, wherein the vibration dampening material is bonded to the rear surface of the rotor in a plurality of bonded layers of said combinations.

14. The method according to claim 9, wherein the rear surface of the rotor is prepared before bonding the vibration dampening material by forming thereon at least one of: protrusions; ribs; fins; knurling; and grooves.

15. A lightweight high speed rotor comprising:
a drive shaft rotatable about an axis of rotation;
a rotor carrying a plurality of blades, the rotor mounted to the drive shaft for rotation therewith, the rotor having a rear cavity; and
a torsional damper bonded in the rear cavity of the rotor where torsional strain energy is present, wherein the torsional damper is composed of a vibration dampening material consisting of one of: particles; and droplets deposited on a surface of the rear cavity of the rotor.

16. The lightweight high speed rotor according to claim 15, wherein said torsional damper comprises a mass of resilient material bonded to a surface of the rotor inside said rear cavity.

17. The lightweight high speed rotor according to claim 15, wherein the rotor comprises a hub and a web joining the plurality of blades to the hub, the web and the hub being integral.

18. The lightweight high speed rotor according to claim 15, wherein the surface of the rear cavity of the rotor includes one of: protrusions; ribs; fins; knurling; and grooves for bonding to the vibration dampening material.

* * * * *